United States Patent [19]

Mayer

[11] 3,907,377
[45] Sept. 23, 1975

[54] ANTILOCKING SYSTEM
[75] Inventor: Friedrich Mayer, Haunstetten, Germany
[73] Assignee: Allgemeine Industrie Commerz, Walter Von Weizenbeck, Munich, Germany
[22] Filed: July 10, 1973
[21] Appl. No.: 377,961

[30] Foreign Application Priority Data
July 11, 1972 Germany............................ 2233939

[52] U.S. Cl............................... 303/21 F; 303/21 B
[51] Int. Cl.............................................. B60t 8/00
[58] Field of Search............ 303/21 B, 21 BE, 21 C, 303/21 CE, 21 CF, 21 CG, 21 F; 188/181 A

[56] References Cited
UNITED STATES PATENTS
2,869,687  1/1959  Keim et al......................... 303/21 F
3,674,317  7/1972  Mangold............................ 303/21 F
3,707,313  12/1972  Michellone et al................ 303/21 F Primary Examiner—Trygve M. Blix
Assistant Examiner—Jesus D. Sotelo
Attorney, Agent, or Firm—Edwin E. Greigg

[57]  ABSTRACT

An antilocking system for motor vehicle wheels with a first and a second sensor, which are coupled with the offside and nearside front wheel of the motor vehicle, respectively. They supply a signal which corresponds to the speed of rotation of the respective wheel. A braking force control device reduces the braking force acting on a given wheel when the relevant sensor provides a signal which indicates that the relevant wheel is inclined to lock. The braking force control device comprises an arrangement which, on the occurrence of a signal which indicates an inclination to lock of a given front wheel, reduces not only the braking force acting on the associated front wheel but also the braking force acting on the rear wheel on the same side of the motor vehicle.

3 Claims, 4 Drawing Figures

ANTILOCKING SYSTEM

BACKGROUND OF THE INVENTION

Various automatically operating devices have been proposed with which motor vehicles are to be repeatedly braked for short periods and in the case of which, between these braking periods, there are short intervals, in which either the braking action exerted with the braking pedal is completely interrupted or the braking force is substantially reduced. Such devices are termed antilocking devices.

In the case of these devices a so-called sensor is connected with each individual wheel of the vehicle, that is to say the sensor produces signals indicating the speed of rotation of the relevant wheel.

In the prior art it was assumed that the changes in the nature of the road surface which might occur along the braking path of the motor vehicle in question could best be taken into account by the brake of each individual wheel being applied to a greater or lesser extent in accordance with the nature of the road surface for this respective wheel, that is to say in accordance with the speed of rotational behavior of this wheel.

OBJECT AND SUMMARY OF INVENTION

It is an object of the present invention to provide an automatically and intermittently acting braking device, which can adapt itself more rapidly to a certain change in the nature of the road surface than previously proposed devices of this type.

This and other objects are in accordance with the invention in that preferably only the two front wheels of the relevant vehicle are equipped with signal producers which are independent from each other and in that the signal of each front wheel sensor, when it indicates a higher degree of braking than that which can stop the vehicle free of skid in the case of a braking action without interruption, acts only on the respective associated rear wheel in addition to produce a reduction in braking of this front wheel.

DESCRIPTION OF THE PREFERRED EMBODIMENTS

Figure 1:
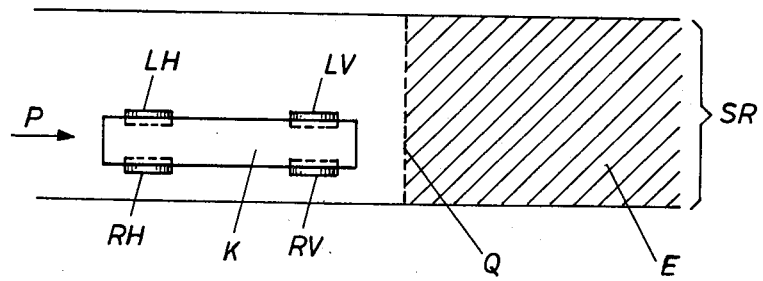
FIG. 1 is a diagrammatic respresentation of a motor vehicle for explaining the principle of the invention.

Referring to FIG. 1 let it be assumed that a motor vehicle K with a speed of 200 km/h is moving in the direction of the arrow P on a road SR, which starting at the transverse line Q to the right is covered with ice, and is sharply braked. At the point in time $t_0$ the left-hand and the right-hand front wheels LV and RV are assumed to have crossed the line Q and it is assumed that 30 msec. expire until the signal supplied by the front wheel sensors interrupts or reduces the braking via the antilocking device for the first time. The wheel base (distance between the front and the rear axles) is assumed to amount to 2 m. The rear wheels LH and RH have in the time of 30 msec. passed along a path of 1.67 m. The rear axle is thus still 33 cm removed from the edge of the ice at Q. This distance of 33 cm is covered at 200 km/h in 5.9 msec. Therefore, if in accordance with the invention the command to interrupt the braking action or the command to reduce the braking action for each front wheel, which is initiated by the associated front wheel sensor, is also caused to act upon the rear wheel on the same side like the front wheel in question, in the case of the rear wheel there will be the arrival at the iced zone to be expected shortly after the interval of 30 msec. (that is to say after 30+5.9 msec. starting at $t_0$) and the driving conditions to be expected for the rear wheels at this position will already occur and the vehicle will therefore behave, despite the sudden passage onto the iced zone, as regards its antilocking control as if from the point in time $t_0$, that is to say from passing over the ice edge Q by the front wheel, as if it had had all its four wheels on the ice zone.

If only the right-hand side of the road was iced and only the right-hand wheels of the braked vehicle were to come on the iced part of the road, the right-hand front wheel will show a greater inclination than the left-hand front wheel to lock and in this case the right-hand side of the system described will respond sooner or more rapidly than the left-hand side. The sensor indicating the danger of locking for the front right-hand wheel would then lower the braking force acting on the right-hand front wheel, and also in accordance with the invention, the braking force acting on the right-hand rear wheel.

The automatically and intermittently acting braking device in accordance with the invention can thus be termed a device in the case of which a coupled antilocking occurs, that is to say there is a coupling of each front wheel with the associated rear wheel in as far as the antilocking control is concerned.

Figure 2:
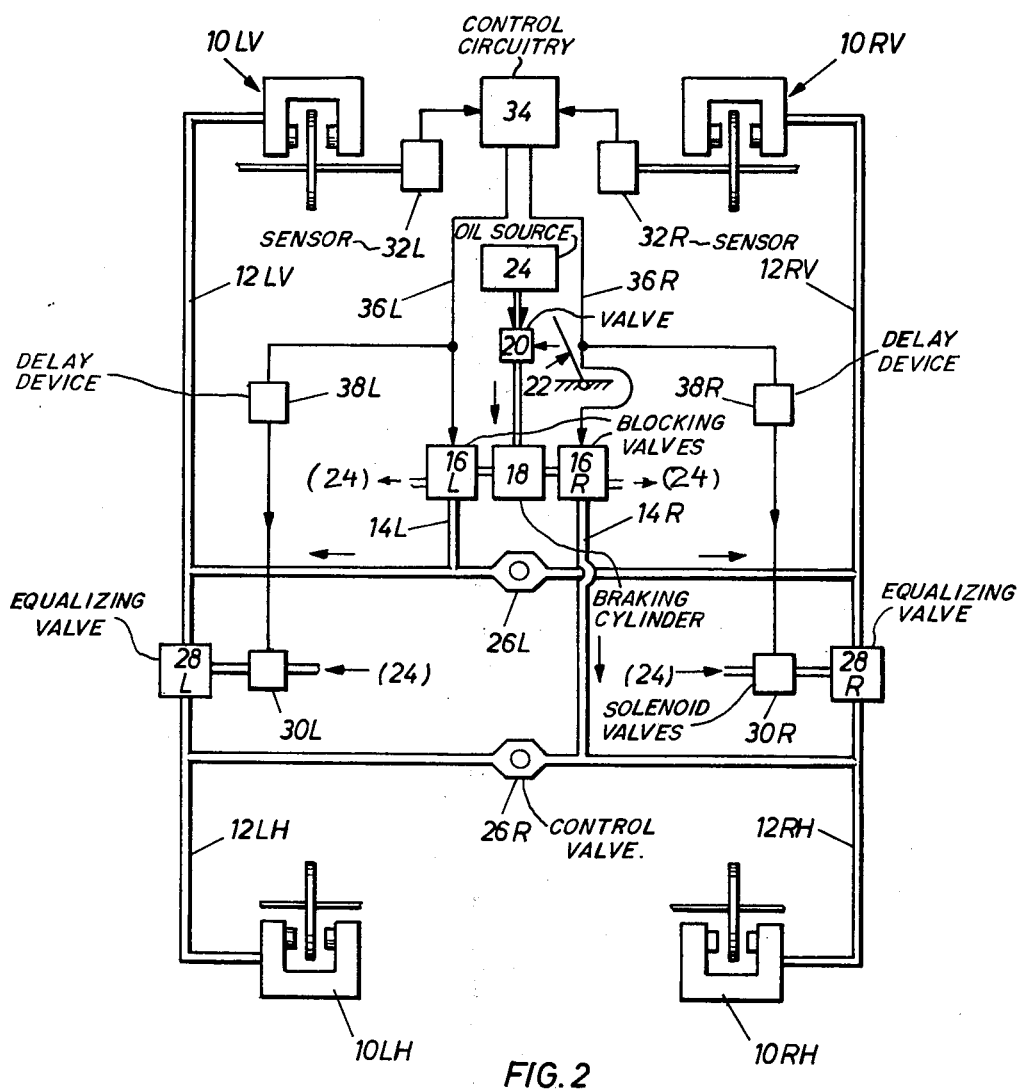
FIG. 2 is a diagrammatic representation of an embodiment of the device in accordance with the invention.

FIG. 2 shows the essential parts of an embodiment of the invention diagrammatically. Of the vehicle wheels (FIG. 1) only the brakes, that is to say the disc brakes 10 LV, 10 RV, 10 LH and 10 RH are shown for the right and left front wheel and the left and right rear wheels. The disc brakes are actuated hydraulically via pressure oil ducts 12 LV, 12 RV, 12 LH and 12 RH. The pressure ducts 12 LV and 12 RV for the front wheel disc brakes are connected via a pressure oil line 14 L, in which a blocking magnetic valve 16 L is arranged, with a corresponding pressure oil exit of a main braking cylinder 18, which can have oil under pressure supplied to it from a pressure oil source 24 via a ferro valve 20, which can be operated by a braking pedal 22. The pressure oil source 24 can be a pump with a supply container and driven by the motor vehicle engine. In the connection between the pressure oil line or duct 14 L and the pressure oil duct 12 RV a side control valve 26 L is arranged, which can be a check valve with a ball-shaped valve body. Between the pressure oil ducts 12 LV and 12 LH an equalizing valve 28 L is arranged, which will be described presently in more detail with reference to FIG. 3. The equalizing valve 28 L can be actuated by pressure oil, which can be supplied to it via magnetic or solenoid valve 30 L from the pressure oil source 24.

Between the pressure oil ducts 12 RV and 12 RH an equalizing valve 28 R is arranged, which corresponds to the equalizing valve 28 L and can be controlled by a solenoid valve 30 R.

The pressure oil ducts 12 LH and 12 RH are furthermore connected with a corresponding pressure oil outlet of the main braking cylinder 18 via a pressure oil line 14 R, in which a blocking magnetic or solenoid valve 16 R is arranged.

Between the pressure oil duct 14 R and the pressure oil duct 12 LH a side control valve 26 R is connected which corresponds to the side control valve 26 L and can be constructed like it.

Furthermore, a leftside front wheel sensor 32 L and an rightside front wheel sensor 32 R are coupled with the axles of the leftside and, respectively, rightside front wheel. The sensor 32 supplied signals, which correspond to the speed of rotation of the front wheels in question, to electronic control circuitry 34, which can be in principle constructed in a conventional manner as, for example, in accordance with the U.S. Pat. Specification No. 3,235,036 or 3,398,995. If the front leftside wheel inclines to lock, the electronic control circuitry 34 passes a signal along a line 36 L to the magnetic blocking valve 16 L, which then interrupts the pressure oil supply to the disc brake for the leftside front wheel in a conventional manner and reduces the braking force acting on the leftside front wheel. A simultaneously reduction of the braking force acting on the rightside front wheel is avoided by the side control valve 26 L, which separates the pressure oil duct 12 LV, in which the pressure is reduced, from the pressure oil duct 12 RV, in which the pressure in the assumed case is to be maintained.

In the case of the present device the pressure reducing signal from the line 36 L is furthermore supplied to the solenoid valve 30 L for the leftside equalizing valve 28 L via the line 36 L, preferably via a delay device 38 L, which brings about a delay of 1 to 5 msec. The equalizing valve 28 L is actuated by this and connects the pressure oil lines 12 LV and 12 LH so that the pressure on the left-hand side of the braking system simultaneously drops. Simultaneously the two side control valves 26 L and 26 R separate the right-hand side of the braking system from the left-hand side and ensure that on the right-hand side no pressure drop occurs.

If the sensor 32 R indicates a tendency to lock of the right-hand front wheel, the electronic control circuitry 34 supplies a corresponding signal via a line 36 R to the blocking solenoid valve 16 R; furthermore, this signal, possibly after delay in a delay device 38 R, is supplied to the magnetic or solenoid valve 30 R for the right-hand equalizing valve 28 R so that now the braking forces, which act on the right-hand front and rear wheels, are simultaneously reduced.

Figure 3:
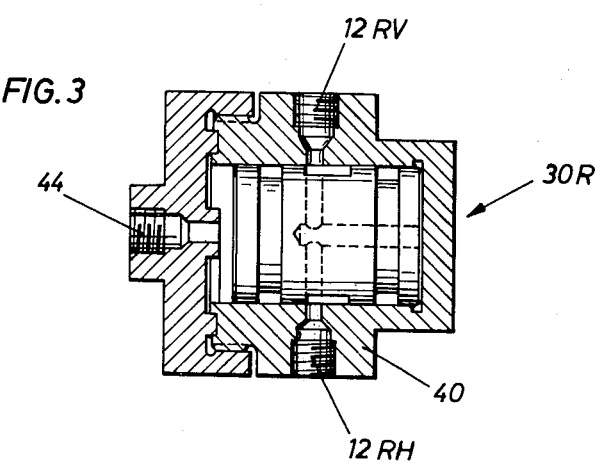
FIG. 3 is a sectional view of an equalizing valve, which can be used in the case of the device in accordance with FIG. 2.
Figure 3A:
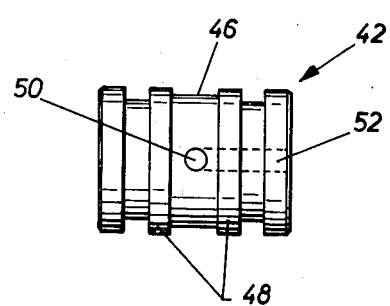
FIG. 3a is a side view of the control piston of the equalizing valve in accordance with FIG. 3.

FIG. 3 shows the right-hand equalizing valve 28 R in section. It has a housing 40 made of two parts joined together by screw means. The housing 40 comprises a control body 42 (FIG. 3a). FIG. 3 shows the equalizing valve in the actuating condition in which it connects the lines 12 RV and 12 RH. The pressure oil pressing the control body to the right and bringing about actuation is supplied from the solenoid valve 30 R via a control input line 44. In the actuating condition the pressure oil lines 12 RV and 12 RH are connected via an annular groove 46, which is formed between the central control lands 48 of four control lands in all of the control body 42. The valve body has a radial hole 50, between the control lands 48, which is connected with an axial hole 52, which for its part opens on the right-hand end face of the control body. If the control signal at the solenoid valve 30 R ceases to exist and the valve then depressurizes the control input line 44 the control body 42 will be pressed by the pressure, acting on its right-hand end face, to the left into a position, in which the connection between the pressure oil lines 12 RV and 12 RH is interrupted by the right-hand land of the two control lands 48.

In the case of the device in accordance with the invention it is therefore possible to do without rear wheel sensors as regards the antilocking control means but nevertheless a more rapid reaction is achieved than is the case with prior art systems.

I claim:

1. An antilocking system for motor vehicles with a first and second sensor, which are coupled with the right and left-hand front wheel of the motor vehicle respectively and which supply a signal which corresponds to the speed of rotation of the respective wheel, and with a braking force control device, which reduces the braking force acting on a given front wheel when the relevant sensor provides a signal which indicates that the given front wheel is inclined to lock, wherein the braking force control device comprises an arrangement in the form of a pair of hydraulic circuits connected to respective ones of said sensors and a corresponding one of the rear wheels of the motor vehicle and means for generating a braking force, said hydraulic circuits being arranged independently of one another so that on the occurrence of a signal, which indicates that a given front wheel is inclined to lock, the braking force acting on the given front wheel is reduced and also the braking force acting only on the rear wheel located on the same side of the motor vehicle as the given front wheel.

2. An antilocking system for motor vehicles with a first and a second sensor, which are coupled with the right and left-hand front wheel of the motor vehicle respectively and which supply a signal which corresponds to the speed of rotation of the respective wheel, and with a braking force control device which reduces the braking force acting on a given front wheel when the relevant sensor provides a signal which indicates that the given front wheel is inclined to lock, wherein the braking force control device comprises an arrangement which on the occurrence of a signal, which indicates that a given front wheel is inclined to lock, reduces not only the braking force acting on the given front wheel but also the braking force acting only on the rear wheel located on the same side of the motor vehicle as the given front wheel, said arrangement including:
   a. a main braking cylinder which comprises a first and second pressure medium outlet for the braking of the front wheels and of the rear wheels respectively;
   b. a first and second pressure medium line which respectively comprise a blocking valve and are respectively connected with pressure medium lines for the braking of the front wheels and the rear wheels respectively;
   c. a first check valve which is arranged between the first pressure medium line and the pressure medium line of the brake of the right-hand front wheel;
   d. a second check valve which is connected between the second pressure medium line and the pressure medium line for the brake of the left-hand rear wheel;

e. a first equalizing valve which is arranged between the pressure medium lines leading to the brake of the left-hand front wheel and the left-hand rear wheel respectively;

f. a second equalizing valve which is connected between the pressure medium lines leading to the brake of the right-hand front wheel and the right-hand rear wheel;

g. A device which opens the first equalizing valve when the first blocking valve closes;

h. a device opens the second equalizing valve when the second blocking valve closes; and i. a device for actuating the blocking valves in accordance with the inclination to lock of the right-hand and/ or the left-hand front wheel.

3. An antilocking system in accordance with claim 2, wherein said arrangement further includes a delay arrangement which ensures that each equalizing valve opens a certain time after the closing of the associated blocking valve.

* * * * *